United States Patent
Gregg et al.

[19]

[11] Patent Number: 6,112,495
[45] Date of Patent: *Sep. 5, 2000

[54] HOLDOWN CONNECTOR WITH CONCAVE SEAT

[75] Inventors: Robert C. Gregg, Yorba Linda; William F. Leek, Anaheim; Alfred D. Commins, Danville, all of Calif.

[73] Assignee: Simpson Strong-Tie Company, Inc., Pleasanton, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/874,838

[22] Filed: Jun. 13, 1997

[51] Int. Cl.$^7$ .......................................................... E04B 1/38
[52] U.S. Cl. ................................. 52/712; 52/289; 52/295; 403/232.1; 403/262
[58] Field of Search ............................. 52/702, 704, 705, 52/707, 712, 713, 714, 715, 289, 295; 403/190, 230, 232.1, 262, 237

[56] References Cited

U.S. PATENT DOCUMENTS

| | | |
|---|---|---|
| D. 224,083 | 7/1972 | Gilb . |
| 573,452 | 12/1896 | Delanunt . |
| 1,578,947 | 3/1926 | Alber . |
| 2,169,474 | 8/1939 | Pederson . |
| 2,321,221 | 6/1943 | Linehan . |
| 3,413,773 | 12/1968 | Fitzgerald . |
| 4,192,118 | 3/1980 | Gilb . |
| 4,321,776 | 3/1982 | Delight . |
| 4,665,672 | 5/1987 | Commins . |
| 4,744,192 | 5/1988 | Commins . |
| 4,825,621 | 5/1989 | Jensen . |
| 4,875,314 | 10/1989 | Boilen . |
| 5,092,097 | 3/1992 | Young . |
| 5,249,404 | 10/1993 | Leek . |
| 5,375,384 | 12/1994 | Wolfson . |
| 5,467,570 | 11/1995 | Leek . |

OTHER PUBLICATIONS

Simpson Strong–Tie Company, Inc. catalog, 1966, p. 13.
Simpson Strong–Tie Company, Inc. catalog, 1967, p. 13.
Simpson Strong–Tie Company, Inc. catalog, 1968, p. 9.
Simpson Strong–Tie Company, Inc. catalog, 1970, p. 16.
Simpson Strong–Tie Company, Inc. catalog, 1979, p. 5.
Simpson Strong–Tie Company, Inc. catalog, 1983, p. 7.
Connectors for Wood Construction, Simpson Strong–Tie Co. catalog, 1986, p. 7.
Connectors for Wood Construction, Simpson Strong–Tie Co. catalog, 1990, p. 9.
Simpson Strong–Tie Company, Inc. catalog, 1993, p. 13.

*Primary Examiner*—Carl D. Friedman
*Assistant Examiner*—Yvonne M. Horton
*Attorney, Agent, or Firm*—James R. Cypher

[57] ABSTRACT

A connector having a concave seat member for connecting a first building structural member to a second building structural member in conjunction with fasteners and an anchor member to resist forces on buildings imposed by earthquakes, hurricanes, tornadoes and other similar cataclysms.

A connector constructed in accordance with the present invention consists of a concave seat member, formed with an opening for receiving an anchor member therethrough to attach the connector to a second building structural member such as a foundation, a first side member connected to the concave seat member, a second side member connected to the concave seat member, and a back member connected to the first and second side members. The back member attaches with fasteners to a first building structural member such as a stud in a framed shear wall. The back member can consist of two back plates each integrally connected to a side member.

53 Claims, 12 Drawing Sheets

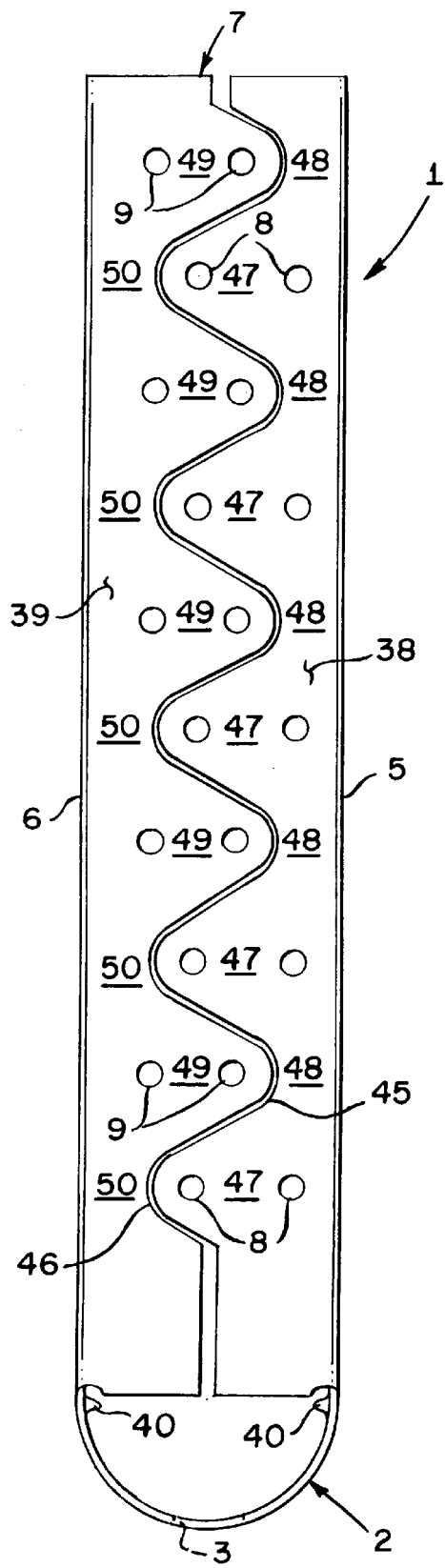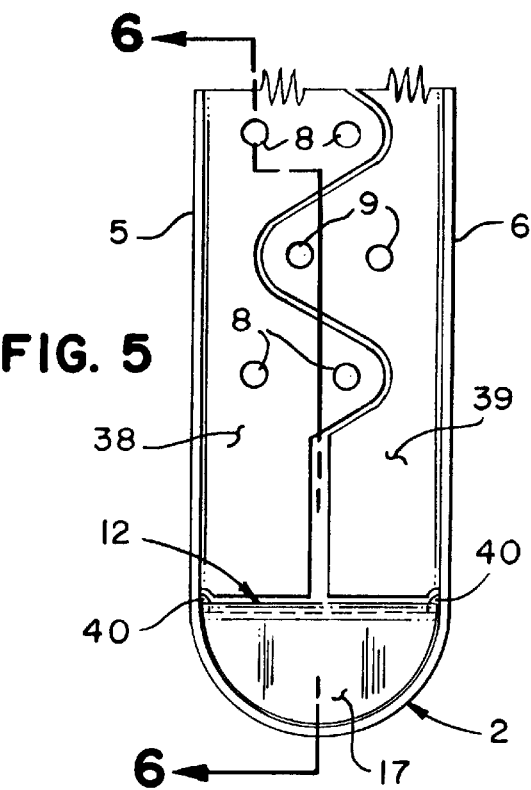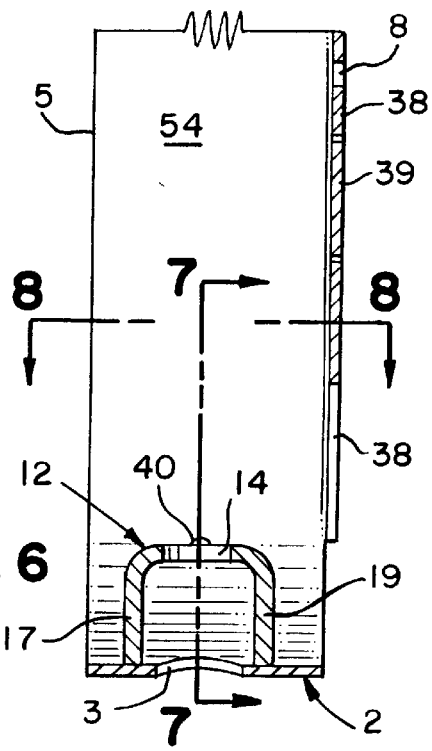
FIG. 4
FIG. 5
FIG. 6

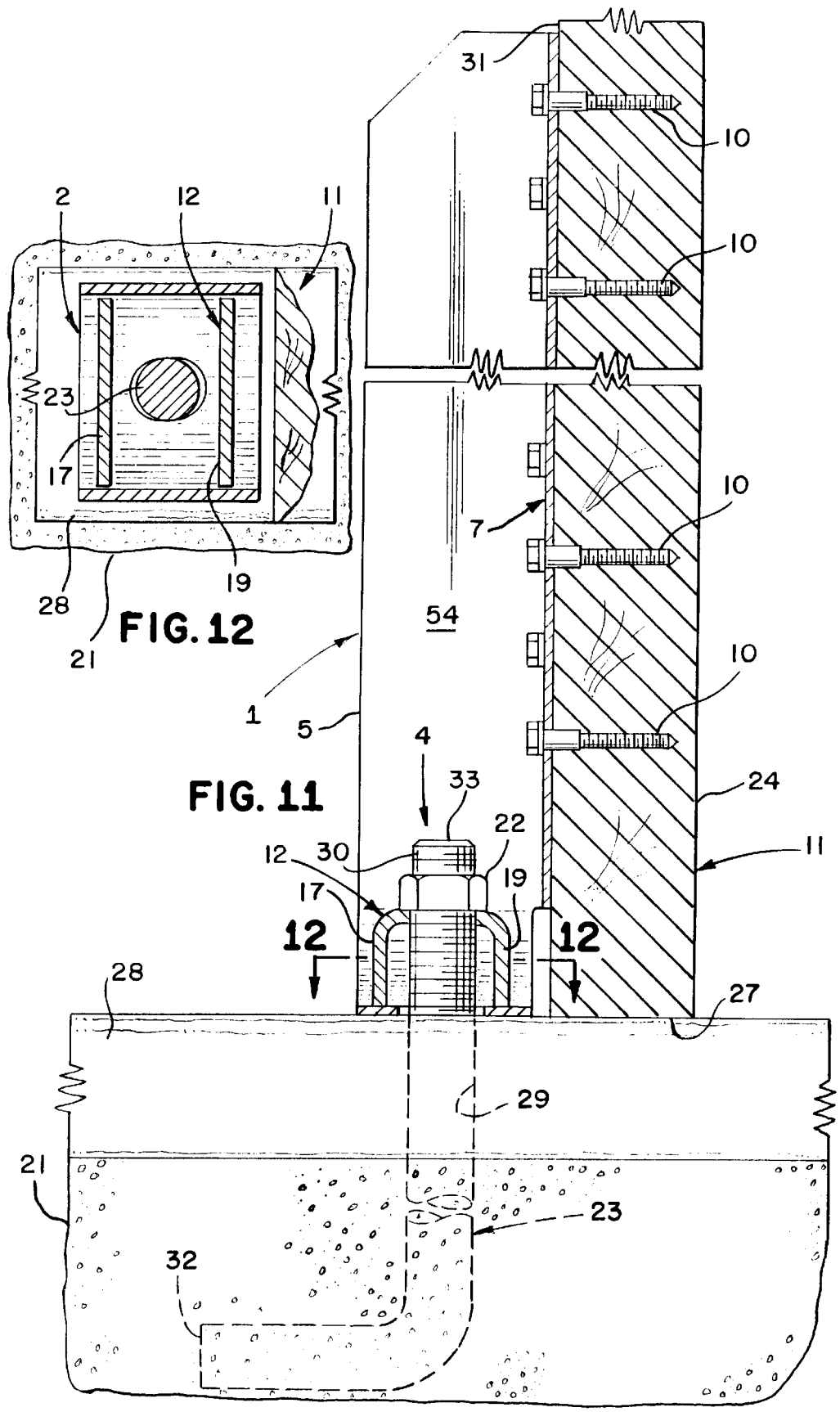

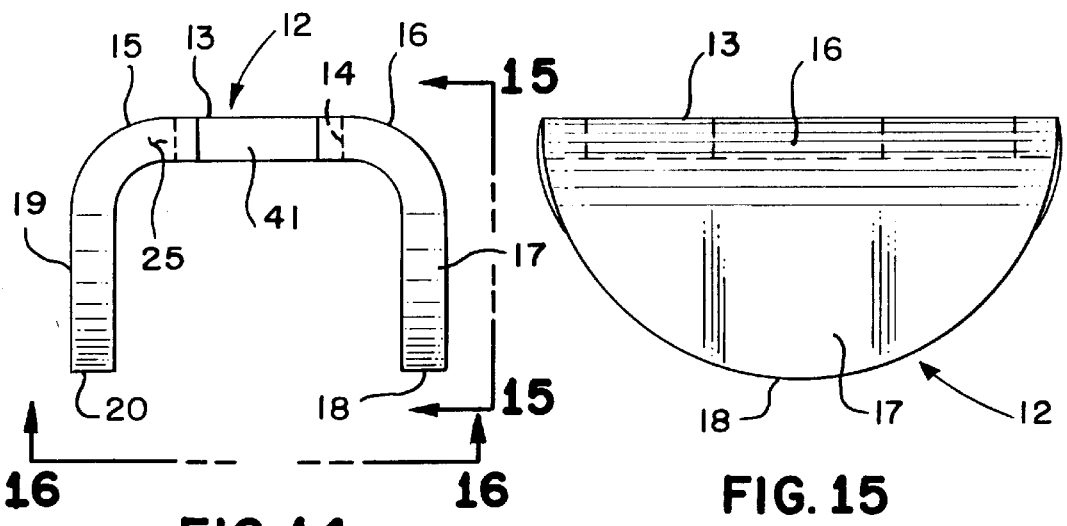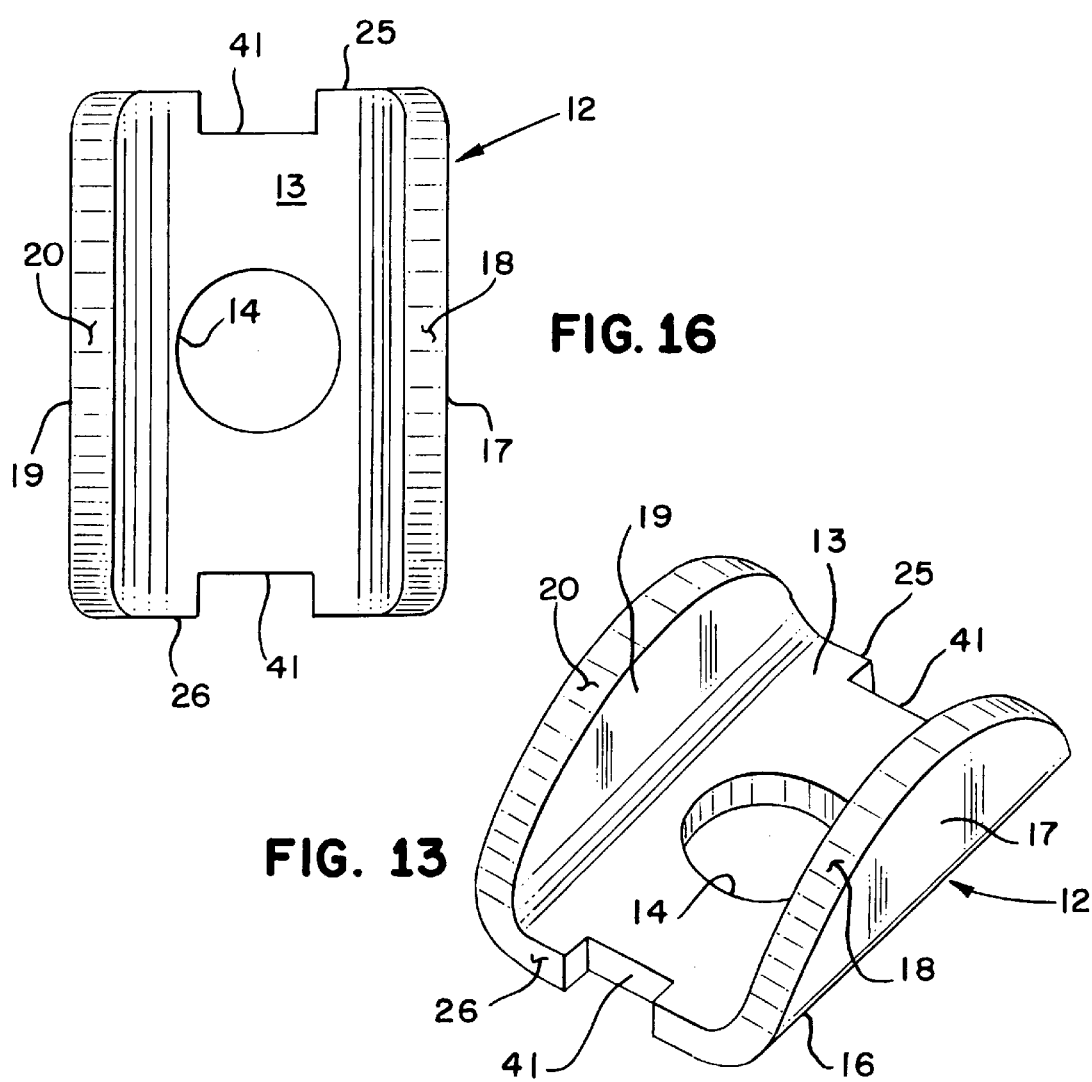

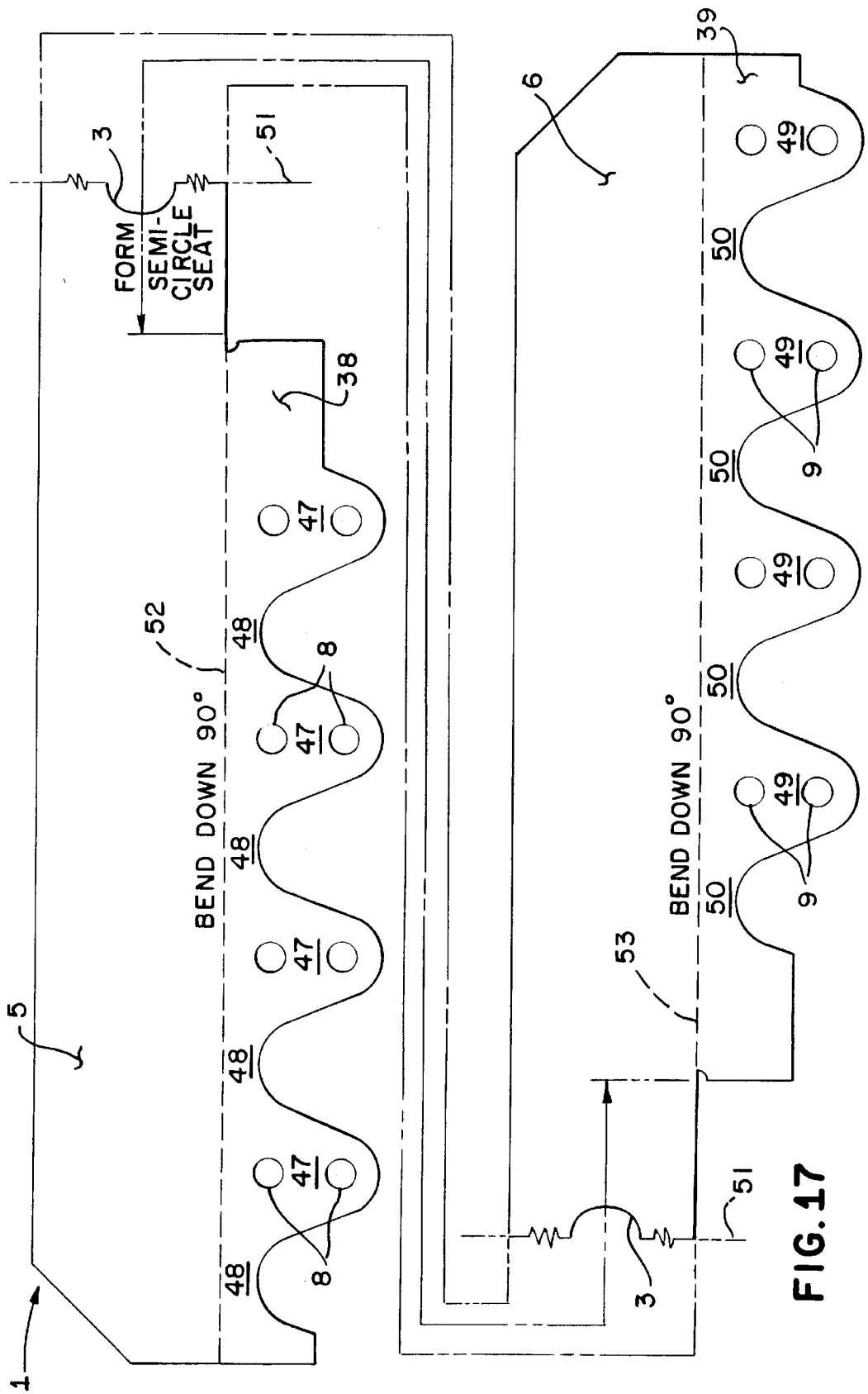

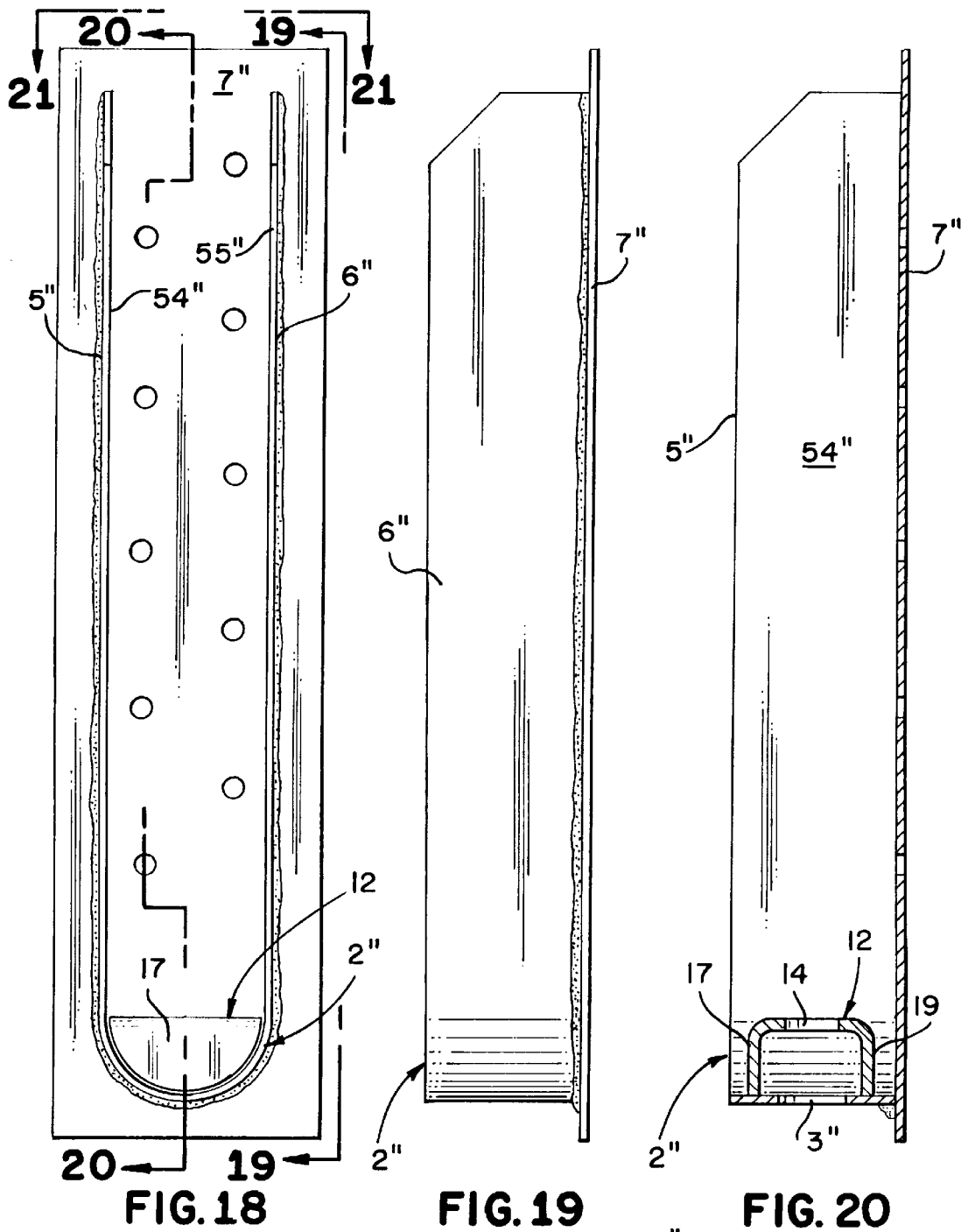
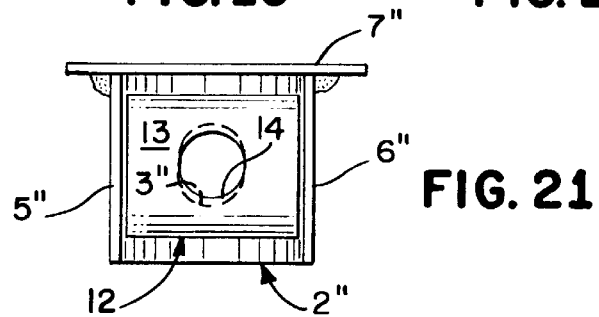
FIG. 18 FIG. 19 FIG. 20 FIG. 21

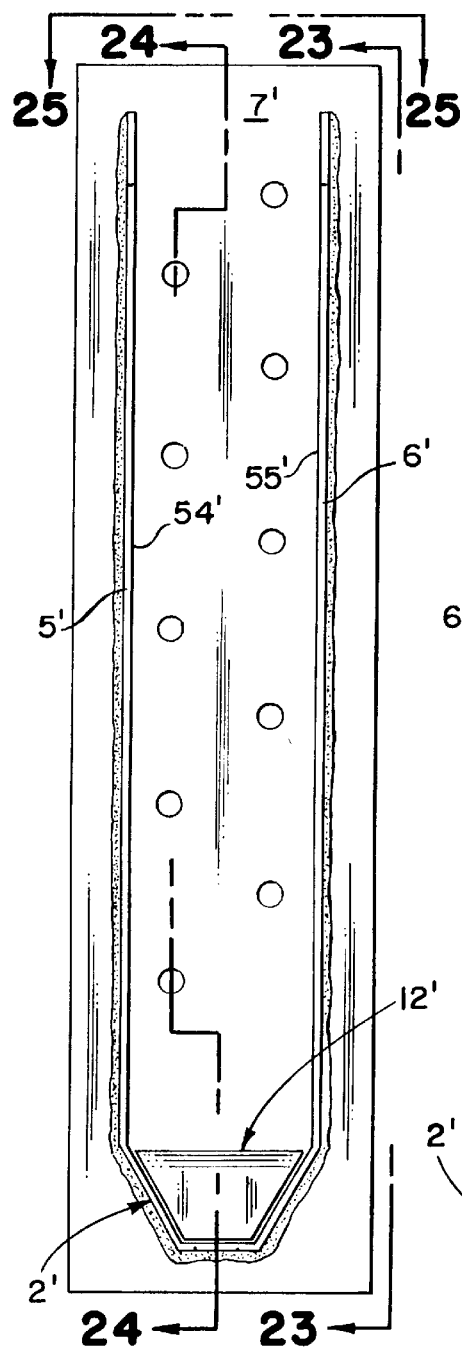
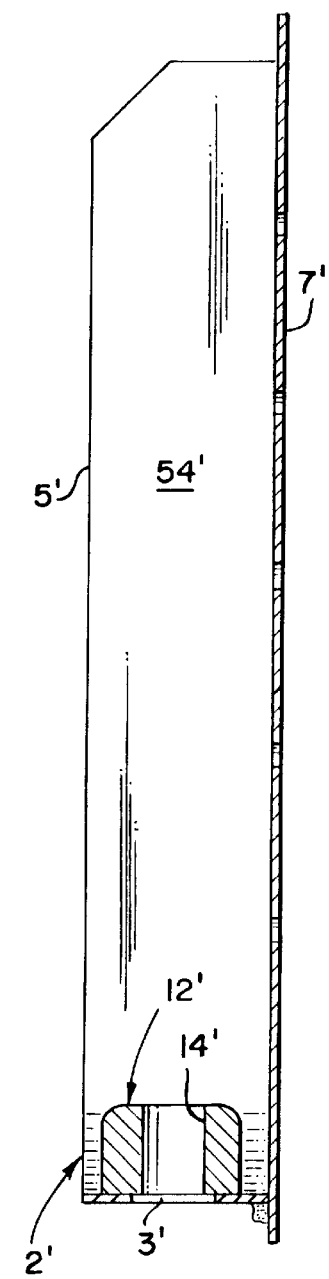
FIG. 22  FIG. 23  FIG. 24
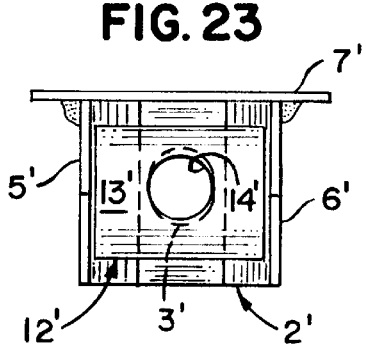
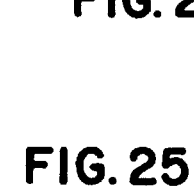
FIG. 25

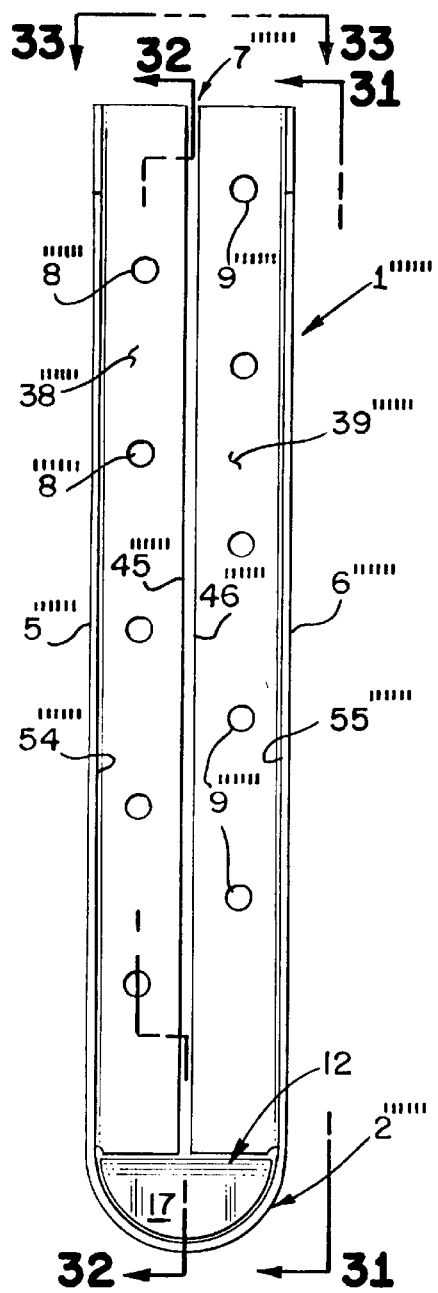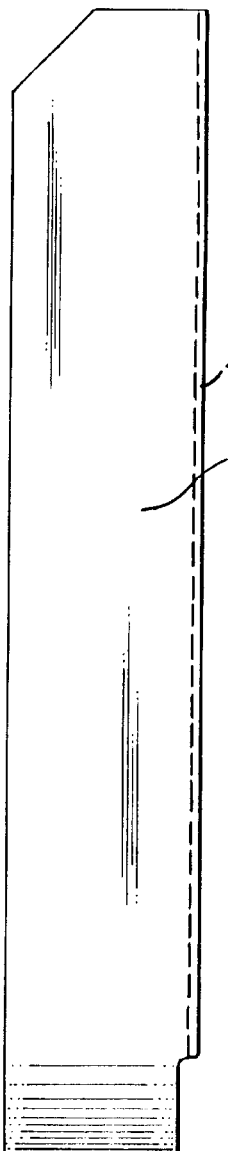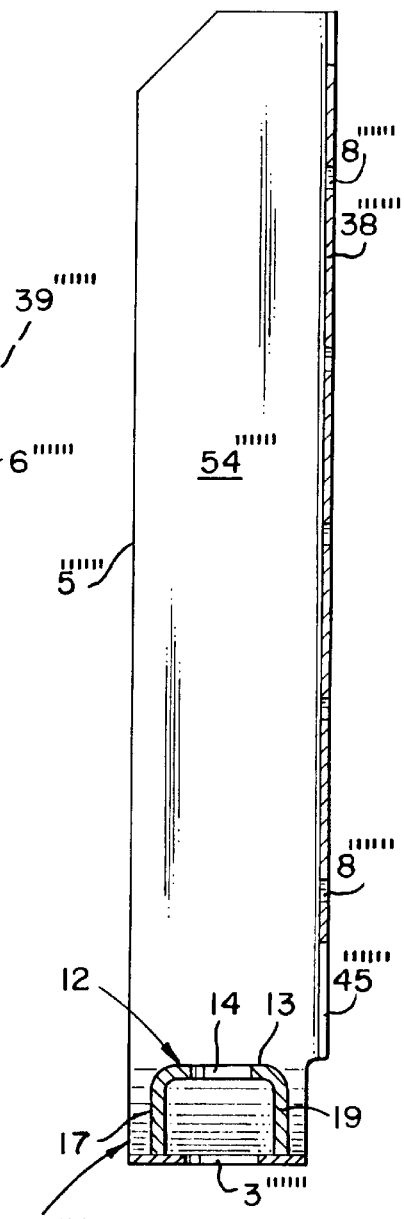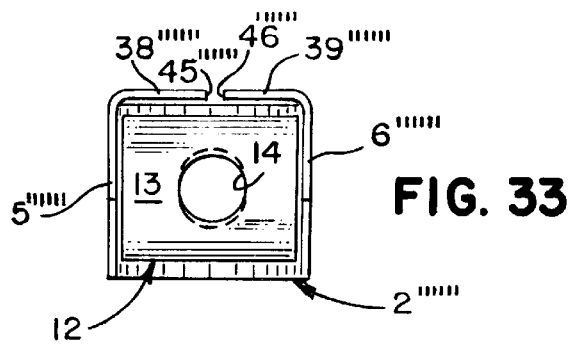
FIG. 30　　FIG. 31　　FIG. 32
FIG. 33

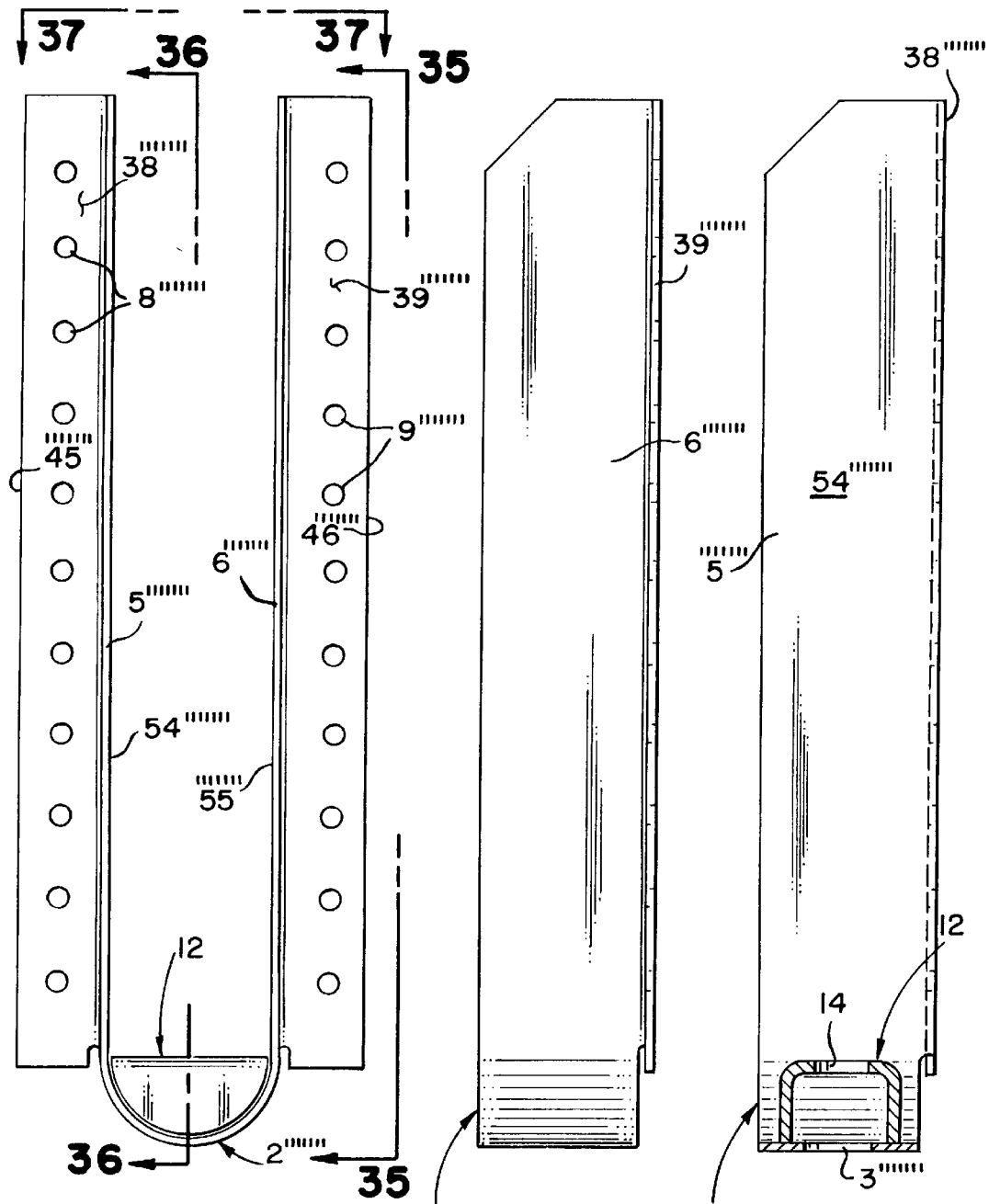
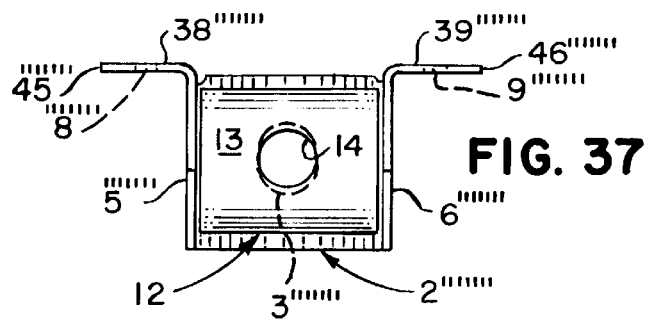

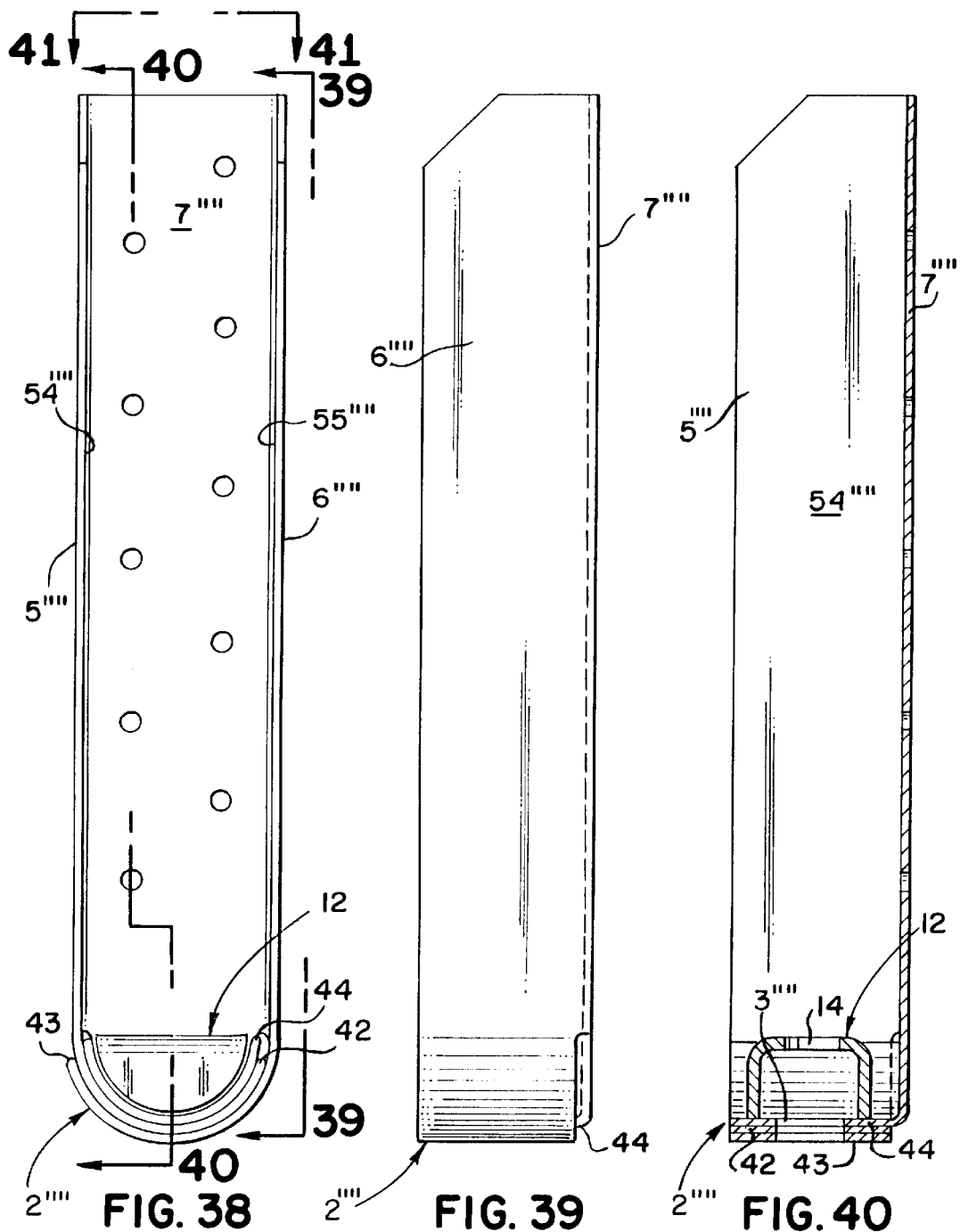
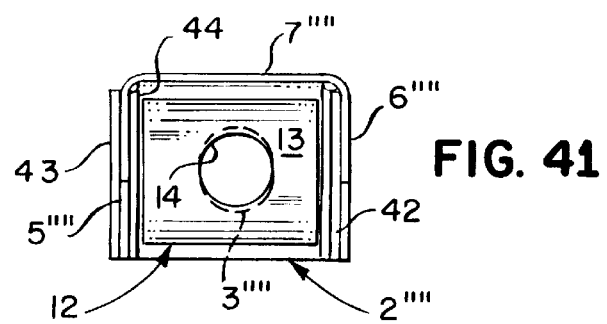

HOLDOWN CONNECTOR WITH CONCAVE SEAT

BACKGROUND

This invention relates to a connector for anchoring a first building structural member to a second building structural member. The connector works in conjunction with a separate anchor member that is received by or is attached to the second building structural member and fastener means for attaching the connector to the first building structural member.

Earthquakes, hurricanes, tornadoes, and floods impose forces on a building that can cause structural failure. To counteract these forces, it has become common practice to strengthen or add ties between the structural members of a building in areas where such cataclysmic forces are typically focused. For example: framed walls can be attached to the foundation rather than merely rest on it; the connections between the framed walls of each floor can be strengthened; and joists can be connected to both their headers and the support member for their header. One of the most common connectors designed for strengthening structural connections is called a holdown by the inventor. Holdowns are commonly used to anchor framed walls to the foundation.

Early holdowns were constructed from two or more separate pieces of metal welded together. These holdowns had to be painted to prevent rusting. They were heavy and costly to produce.

State of the art holdowns are made from galvanized sheet metal formed on progressive die machines that require no welding or painting. See U.S. Pat. No. 4,665,672, granted May 19, 1987, to Commins, Gilb and Littleton; U.S. Pat. No. 5,092,097 granted Mar. 3, 1992, to Young; and U.S. Pat. No. 5,249,404, granted Oct. 5, 1993, to Leek and Commins. These advancements have reduced the cost of making holdowns while increasing their ability to withstand tension forces. However, recent severe earthquakes in San Francisco, Los Angeles, and Kobe, Japan, demonstrate that holdowns capable of being mass produced and installed inexpensively should be made even stronger for many connections.

All the holdown connectors of the prior art that work in conjunction with a separate anchor member work in a similar fashion. The anchor member, which is attached to the second structural member, attaches at the seat of the connector. This seat is connected to a back member. The back member attaches to the first building structural member, generally a stud in a framed wall. Most holdown connectors have one or more side members to increase the strength of the connector or to connect the seat member to the back member.

All prior art holdown connectors that attach to a separate anchor member share a common characteristic: they are formed with a planar or flat seat. Furthermore, the interfaces between the seat member and the back and side members are generally perpendicular.

When sufficiently strong tension forces are exerted on structural members attached to prior art holdown connectors, the seat of the connector will deflect, and the back member, and side members, if present, will bend inward, toward the attachment point of the seat with the anchor member. The action is somewhat analogous to pulling a slack rope taught. This deflection of the seat, back, and side members elongates the holdown connector, loosening the connection between the joined structural members. The effectiveness of the holdown is reduced.

Accordingly, there is a continuing need in the art for an improved connector that can be made inexpensively and installed easily, which better withstands forces imposed by cataclysmic events.

SUMMARY OF THE INVENTION

The object of the present invention is to provide a connector that better withstands tension forces than the prior art while still being economical to produce and install.

The object of making a stronger connector is achieved by forming the seat member of the connector in a concave shape. The concave seat member of the present invention reduces excess structural material that is formed perpendicular to the direction of tension forces, thereby reducing the amount of material that is displaced by tension loads.

The object of making a holdown that is economical to produce is achieved by utilizing a design that is formed from a blank of galvanized metal on standard die press machinery, eliminating costly secondary operations such as painting and welding.

The object of making a holdown that is easy to install is achieved by utilizing a design that is amenable to current building practices.

These and other objects of the present invention will become apparent with reference to the drawings, the description of the preferred embodiment and the claims.

BRIEF DESCRIPTION OF THE DRAWINGS

FIG. 4 is a back elevation view of the preferred form of the holdown connector taken along line 4—4 in FIG. 2.

FIG. 5 is a partial front elevation view of the preferred form of the holdown connector with an n-shaped washer member present.

FIG. 6 is a cross sectional side view of the preferred form of the holdown connector taken along line 6—6 in FIG. 5.

FIG. 11 is a side sectional view of the preferred form of the holdown connector attached to building structural members by fasteners at the back member and an anchor bolt in the concave seat member.

FIG. 12 is a top sectional vew of the preferred form of the invention, taken along line 12—12 in FIG. 11.

FIG. 13 is a perspective view of the n-shaped washer member.

FIG. 14 is a side elevation view of the n-shaped washer member.

FIG. 15 is a front elevation view of the n-shaped washer member taken along line 15—15 in FIG. 14.

FIG. 16 is a bottom view of the n-shaped washer member taken along line 16—16 in FIG. 14.

FIG. 17 is a plan view of the sheet metal blank from which the preferred form of the holdown connector illustrated in FIG. 1 may be constructed.

FIG. 18 is a front elevation view of the second alternate form of the holdown connector in which a separate back member is welded to the concave seat member and the side members.

FIG. 19 is a side elevation view of the second alternate form of the holdown connector taken along line 19—19 in FIG. 18.

FIG. 20 is a cross section view of the second alternate form of the holdown connector taken along line 20—20 in FIG. 18.

FIG. 21 is a top plan view of the second alternate form of the holdown connector taken along line 21—21 in FIG. 18.

FIG. 22 is a front elevation view of the first alternate form of the holdown connector in which the concave seat member is angular in form.

FIG. 23 is a side elevation view of the first alternate form of the holdown connector taken along line 23—23 in FIG. 22.

FIG. 24 is a cross section view of the first alternate form of the holdown connector taken along line 24—24 in FIG. 22. The connector is shown with a solid washer member.

FIG. 25 is a top plan view of the first alternate form of the holdown connector taken along line 25—25 in FIG. 22.

FIG. 30 is a front elevation view of the sixth alternate form of the holdown connector in which the distal edges of the first and second back plates follow a straight path. The connector is shown with an n-shaped washer member.

FIG. 31 is a side elevation view of the sixth alternate form of the holdown connector taken along line 31—31 in FIG. 30.

FIG. 32 is a cross section view of the sixth alternate form of the holdown connector taken along line 32—32 in FIG. 30.

FIG. 33 is a top plan view of the sixth alternate form of the holdown connector taken along line 33—33 in FIG. 30.

FIG. 34 is a front elevation view of the seventh alternate form of the holdown connector in which the distal edges of the first and second back plates lie in antipodal relation to each other. The connector is shown with an n-shaped washer member.

FIG. 35 is a side elevation view of the seventh alternate form of the holdown connector taken along line 35—35 in FIG. 34.

FIG. 36 is a cross section view of the seventh alternate form of the holdown connector taken along line 36—36 in FIG. 34.

FIG. 37 is a top plan view of the seventh alternate form of the holdown connector taken along line 37—37 in FIG. 34.

FIG. 38 is a front elevation view of the fourth alternate form of the holdown connector in which the concave seat member consists of first, second and third overlapping seat plates. The connector is shown with an n-shaped washer member.

FIG. 39 is a side elevation view of the fourth alternate form of the holdown connector taken along line 39—39 in FIG. 38.

FIG. 40 is a cross section view of the fourth alternate form of the holdown connector taken along line 40—40 in FIG. 38.

FIG. 41 is a top plan view of the fourth alternate form of the holdown connector taken along line 41—41 in FIG. 38.

DESCRIPTION OF THE PREFERRED EMBODIMENT

Figures 1, 2, 3:
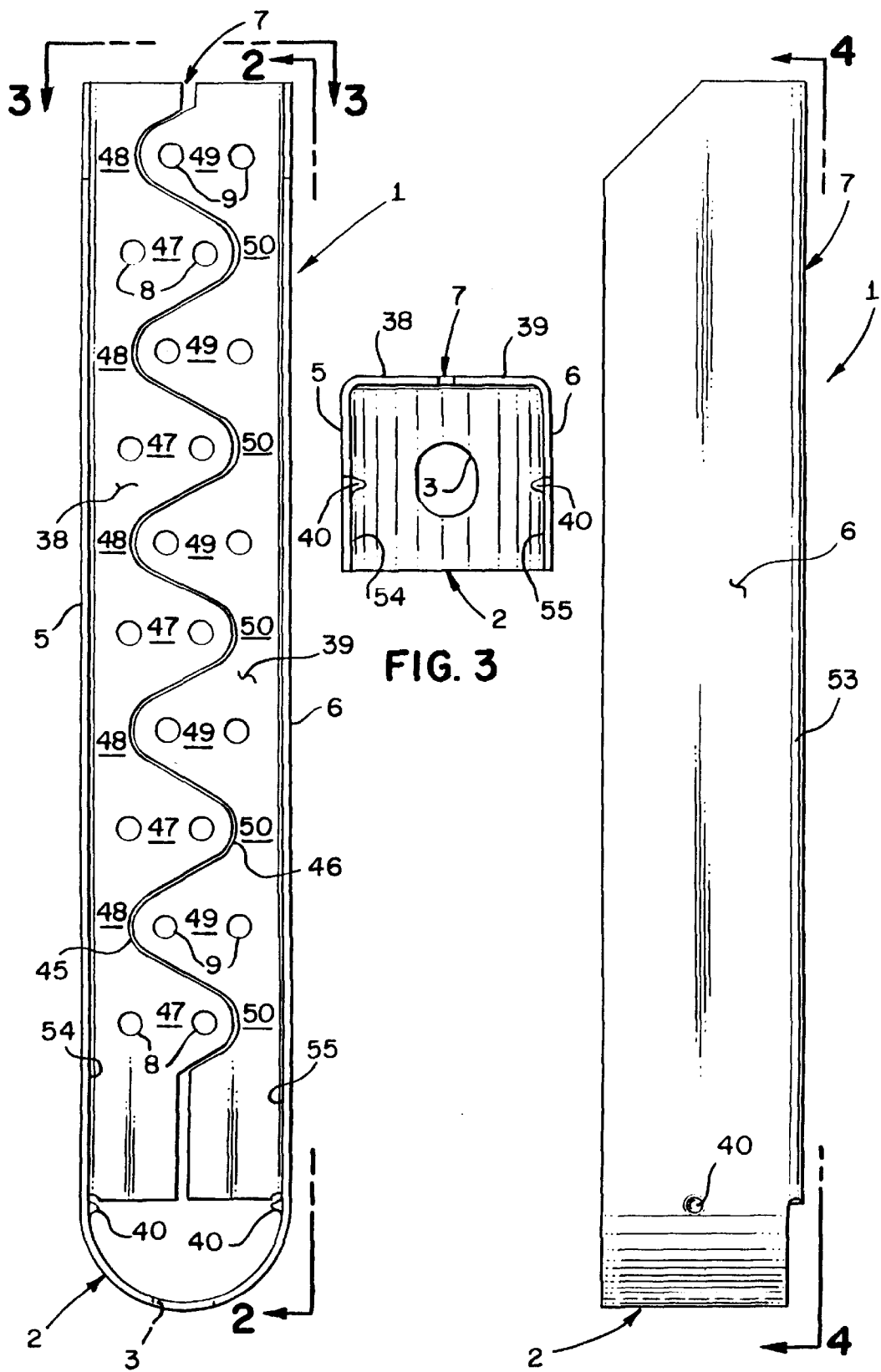
FIG. 1 is a front elevation view of the preferred form of the holdown connector.
FIG. 2 is a side elevation view of the preferred form of the holdown connector taken along line 2—2 in FIG. 1.
FIG. 3 is a top plan view of the preferred form of the holdown connector taken along line 3—3 in FIG. 1.
Figure 7:
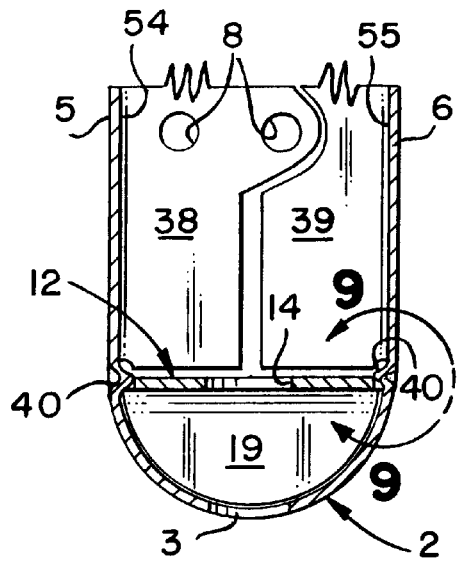
FIG. 7 is a cross sectional view of the preferred form of the holdown connector taken along line 7—7 in FIG. 6.
Figure 8:
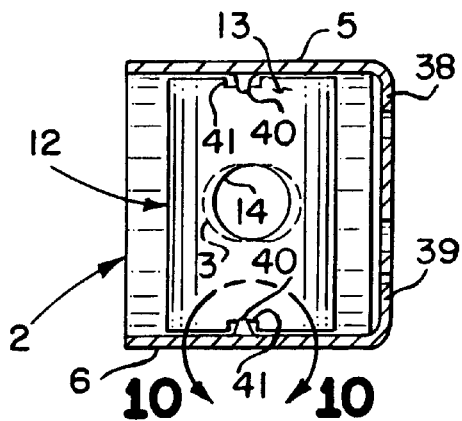
FIG. 8 is a top view of a portion of the preferred form of the holdown connector taken along section line 8—8 in FIG. 6.
Figure 9:
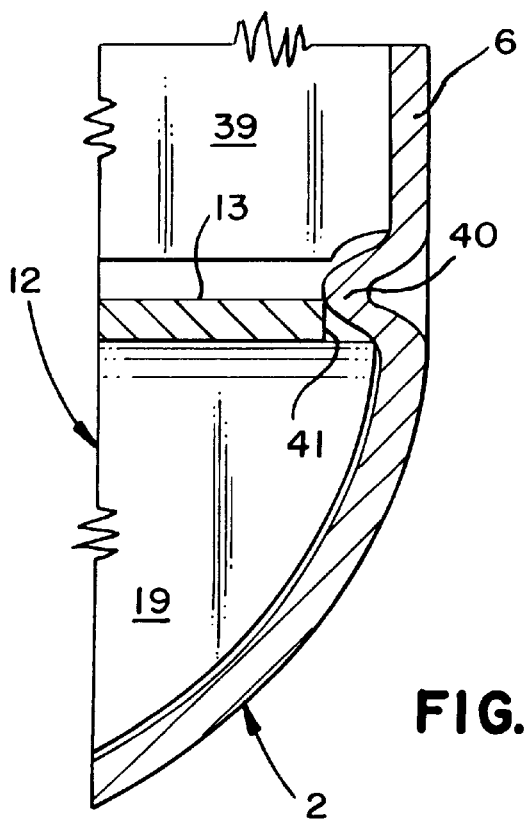
FIG. 9 is an enlarged, sectional side view of the preferred form, showing the second side member protrusion and the interface between it and the notch in the second side of the receiving portion of the washer member, taken along line 9—9 in FIG. 7.
Figure 10:
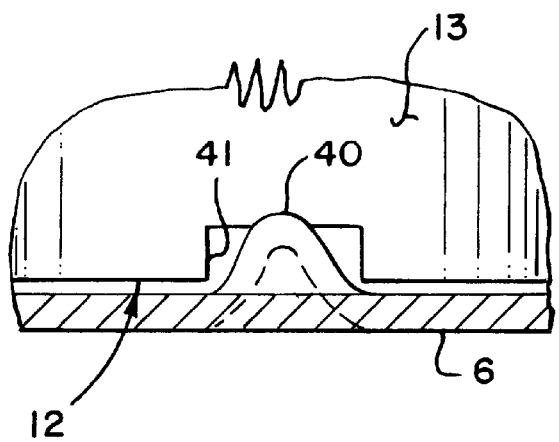
FIG. 10 is an enlarged top sectional view of the preferred form, showing the second side member protrusion and the interface between it and the notch in the second side of the receiving portion of the washer member, taken along line 10—10 in FIG. 8.
Figure 26:
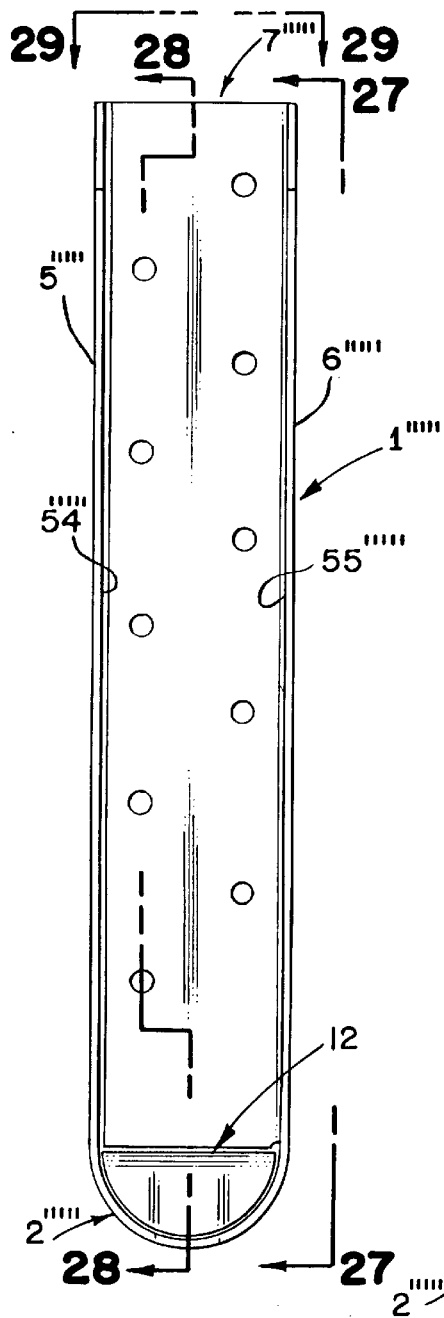
FIG. 26 is a front elevation view of the fifth alternate form of the holdown connector in which the first and second back plates overlap each other. The connector is shown with an n-shaped washer member.
Figure 27:
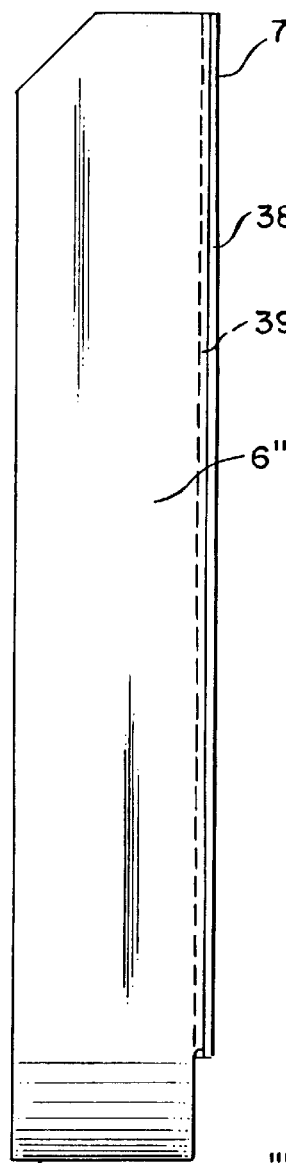
FIG. 27 is a side elevation view of the fifth alternate form of the holdown connector taken along line 27—27 in FIG. 26.
Figure 28:
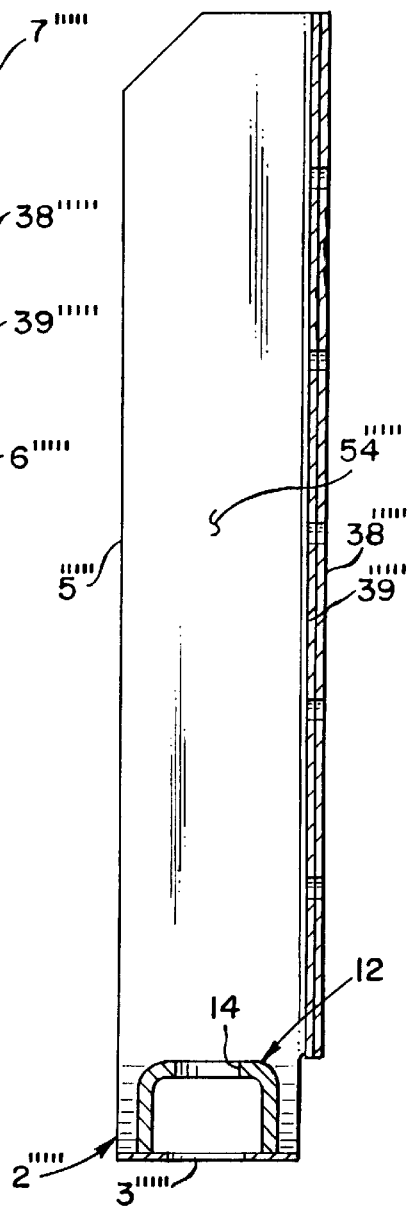
FIG. 28 is a cross section view of the fifth alternate form of the holdown connector taken along line 28—28 in FIG. 26.
Figure 29:
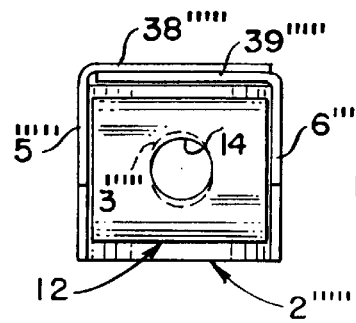
FIG. 29 is a top plan view of the fifth alternate form of the holdown connector taken along line 29—29 in FIG. 26.

As shown in FIG. 1, one preferred embodiment of a connector 1 constructed in accordance with the present invention consists of a concave seat member 2 formed with an opening 3 for receiving an anchor member 4 therethrough, a first side member 5 connected to the concave seat member 2, a second side member 6 connected to the concave seat member 2, and a back member 7 connected to the first and second side members 5 and 6. As is shown in FIG. 11, the connector 1 is attached to a first building structural member 11 with fastener means 10 at the back member 7.

In the present invention, the seat 2 of the connector 1 is formed as a concave member. As seen in FIG. 1, in the preferred form of the invention the concave seat member 2 is curvilinear, but angular variations are also considered to be within the scope of the present invention. FIGS. 22, 23, 24 and 25, show a first alternate form of the connector 1' formed with a concave seat 2' that is formed by bending the concave seat member 2' at selected points. The angular variation—a more complete description occurs below—is composed of similar members as the preferred form shown in FIG. 1 and like parts are designated with the symbol (').

Furthermore, in the preferred form of the invention, the connector 1 is formed from a single blank of sheet metal, but it will be appreciated that modifications can be made without departing from the scope of the present invention. In the first alternate form of the connector 1', shown in FIGS. 22, 23, 24 and 25, the concave seat member 2' is integrally connected to the first and second side members 5' and 6' as in the preferred form. However, a separate back member 7' is welded to the concave seat member 2' and first and second side members 5' and 6'.

FIGS. 18, 19, 20 and 21 show a second alternate form of the connector 1" which is formed in a similar manner as the first alternate form of the connector 1', except that it has a curvilinear concave seat member 2". The second alternate form is composed of similar members as the preferred form shown in FIG. 1 and like parts are designated with the symbol (").

A third alternate form constructed in accordance with the present invention is suggested by U.S. Pat. No. 4,852,621, granted May 2, 1989 to Jensen, and also by U.S. Pat. No. 5,092,097, granted Mar. 3, 1992 to Young. In this alternate form, first and second overlapping, concave seat plates 42 and 43 combine to make a concave seat member. FIGS. 38, 39, 40 and 41 show a further modified form of the present invention having first and second overlapping concave seat plates 42 and 43 as in the third alternate form.

A fourth alternate form of the connector 1"" constructed in accordance with the present invention is suggested by U.S. Pat. No. 5,467,570, granted Nov. 21, 1995 to Leek. This fourth alternate form is shown in FIGS. 38, 39, 40 and 41. The fourth alternate form is composed of similar members as the preferred form shown in FIG. 1 and like parts are designated with the symbol (""). In this alternate form the concave seat member 2"" consists of first, second and third overlapping, concave seat plates 42, 43 and 44, the third concave seat plate 44 being integrally attached to the back member 7"". This alternate form of the connector 1"" would be constructed from a blank of sheet metal by first forming an embossment in the third seat plate 44 to form a concavity in the third seat plate 44 and then bending the third concave seat plate 44 out of the plane of the blank. The first and second side members 5"" and 6"" are then bent out of the plane of the blank. The first concave seat plate 42 is then bent around the third concave seat plate 44. Finally, the second concave seat plate 43 is bent around the third and first concave seat plates 44 and 42.

One preferred embodiment of the connector 1 and several alternate forms constructed in accordance with the present invention are suggested by U.S. Pat. No. 4,665,672, granted May 19, 1987 to Commins, Gilb and Littleton. As is shown in FIG. 1, in a preferred embodiment, the back member 7 consists of first and second back plates 38 and 39, rather than a single member. More specifically, a first back plate 38 integrally connects to the first side member 5 and a second back plate 39 integrally connects to the second side member 6. The first back plate 38 is formed with a distal edge 45 and the second back plate 39 is formed with a distal edge 46. The first and second back plates 38 and 39 may take several alternate forms.

In a fifth alternate form of the connector 1""', shown in FIGS. 26, 27, 28, and 29 the first back plate 38""" overlaps a portion of the second back plate 39""". The fifth alternate form is composed of similar members as the preferred form and like parts are designated with the symbol (""').

In a sixth alternate form of the connector 1""'', shown in FIGS. 30, 31, 32 and 33, the first back plate 38""'' is formed with a distal edge 45""'', and the second back plate 39""'' is formed with a distal edge 46""'' that lies in close proximity to the distal edge 45""'' of the first back plate 38 ""''. The sixth alternate form is composed of similar members as the preferred form and like parts are designated with the symbol (""'').

In a seventh alternate form of the connector 1""''', shown in FIGS. 34, 35, 36 and 37, the first back plate 38""''' is formed with a distal edge 45""''' and the second back plate 39""''' is formed with a distal edge 46""''' that lies in antipodal relation to the distal edge 45""''' of the first back plate 38 ""'''. The seventh alternate form is composed of similar members as the preferred form and like parts are designated with the symbol (""''').

As seen in FIGS. 1, 2, 3, 4, 5, 6, 7, 8, 9, 10, 11 and 12 in one preferred embodiment of a connector 1 constructed in accordance with the present invention, the back member 7 comprises a first back plate 38 integrally connected to the first side member 5 and a second back plate 39 integrally connected to the second side member 6. The first back plate 38 is formed with wide portions 47 that alternate with narrow portions 48. The second back plate 39 is similarly formed with alternating wide and narrow portions 49 and 50 that are offset from the wide and narrow portions 47 and 48 of the first back plate 38 such that the distal edge 45 of the first back plate 38 lies in close proximity to the distal edge 46 of the second back plate 39. Furthermore, in this preferred form of the invention the distal edges 45 and 46 of the first and second back plates 38 and 39 follow curvilinear paths.

This preferred embodiment, as is best shown in FIGS. 1 and 17, is formed by bending a galvanized sheet metal blank around its lateral axis 51 to form the concavity in the concave seat member 2 with the first and second side members 5 and 6 integrally connected to the concave seat member 2. The first side member 5 is then bent at back bend line 52 to form first back plate 38 which is integrally connected to the first side member 5. The second side member 5 is then bent at back bend line 53 to form second back plate 39 which is integrally connected to the second side member 6. Formation in this manner results in an integral connection of the first and second side members 5 and 6 to the unitary concave seat member 2, giving this preferred embodiment added strength to resist both tension and compression forces.

In this preferred embodiment, shown in FIG. 1, the concave seat member 2 and the first and second side members 5 and 6 can be formed as relatively narrow members to allow the anchor member 4 to be placed near the first building structural member 11. Further, when the first and second side members 5 and 6 are formed as narrow members installation of fastener means 10 with a power tool is facilitated, because the first and second side members 5 and 6 are less likely to block access by the user with a power tool.

Referring to FIG. 1, in this preferred embodiment, the first and second side members 5 and 6 of the connector 1 are formed generally parallel to each other. The first and second side members 5 and 6 can also be formed so that they converge toward each other as the distance from the concave seat member 2 increases.

Referring to FIGS. 5–16, 22, 23, 24 and 25, the present invention is preferably used with a substantially rigid washer member 12 or 12'. As best seen in FIG. 13, the washer member 12 is formed with a receiving portion 13 having an opening 14 for receiving the anchor member 4 therethrough.

In one embodiment this substantially rigid washer member 12 can sit proximate the first side member 5 and the second side member 6 to provide lateral bracing to the first and second side members 5 and 6 when the connector 1 is under tension loads.

As seen in FIG. 11, in the preferred embodiment the washer member 12 sits proximate the concave seat member 2, rather than sitting proximate the first and second side members 5 and 6. In the preferred embodiment the washer member 12 can provide lateral bracing to the first and second side members 5 and 6 similar to that of a washer member that sits proximate side member 5 and 6. This is because the receiving portion 13 of the washer member 12 is of a width that closely fits between the first side member 5 and the second side member 6. Thus, the concave seat member 2 that receives the washer member 12 is braced at points where it is substantially as wide as the distance between the first and second side members 5 and 6.

In one embodiment, the substantially rigid washer member 12' can be formed as a solid member with an opening 14' for receiving the anchor member 4 therethrough. See FIGS.

22, 23, 24 and 25. As noted above, the receiving portion 13' should be wide enough so that the washer member 12' closely fits between the first side member 5' and the second side member 6'. Furthermore, the washer member 12' should be formed to be in substantial registration with the concave seat member 2' to provide improved bracing of the concave seat member 2'. The preferred embodiment of the washer member 12, however, is n-shaped. See FIG. 13.

As is best seen in FIG. 13, the preferred n-shaped washer member 12 has a receiving portion 13 formed with a back edge 15 and an outward edge 16. Referring to FIG. 14, an outward flange 17 integrally connects to the outward edge 16 of the receiving portion 13 and extends toward the concave seat member 2. As seen in FIG. 15, the outward flange 17 has an outward flange base 18 that is formed to be in registration with the concave seat member 2. Similarly, a back flange 19 integrally connects to the back edge 15 and extends toward the concave seat member 2. The back flange 19 has a back flange base 20 that is formed to be in registration with the concave seat member 2.

Referring to FIGS. 1–10 and 13–16, the n-shaped washer member 12 and the first and second side members 5 and 6 of the connector 1 are, ideally, formed to allow only limited movement of the n-shaped washer member 12 with respect to the connector 1. This can be accomplished, in part, by forming protrusions 40 on the inner surfaces 54 and 55 of the first and second side members 5 and 6 where they interface with the concave seat member 2. The protrustions 40 are formed by applying pressure to the first and second side members 5 and 6 at selected points. The protrusions 40 hold the n-shaped washer member 12 on the concave seat member 2. Sliding movement of the n-shaped washer member 12 with respect to the concave seat 2 of the connector 1 can be prevented or limited by forming notches 41 in the first and second sides 25 and 26 of the receiving portion 13 of the n-shaped washer member 12 that closely receive portions of the protrusions 40 on the inner surfaces 54 and 55 of the first and second side members 5 and 6. Preferably, the notches 41 formed in the sides 25 and 26 of the receiving portion 13 are formed with a selected length to allow limited sliding of the n-shaped washer member 12 with respect to the concave seat member 2 to allow for installations where the anchor member 4 is disposed askew to the first building structural member 11.

To summarize, the preferred embodiment of connector 1 constructed with a concave seat member 2 is used with a substantially rigid n-shaped washer member 12. In one preferred embodiment, shown in FIG. 11, the concave seat member 2 is formed with an opening 3 for receiving an anchor member 4 therethrough to attach the connector 1 to a second building structural member 21. A first side member 5 integrally connects to the concave seat member 2. A second side member 6 integrally connects to the concave seat member 2. The first side member 5 integrally connects to a first back plate 38. The second side member 6 integrally connects to a second back plate 39. The first and second back plates 38 and 39 serve together as the back member 7. The first back plate 38 is formed with alternating wide and narrow portions 47 and 48 and the second back plate 39 is similarly formed with alternating wide and narrow portions 49 and 50 that are offset from the first back plate 38 such that the distal edge 45 of the first back plate 38 lies in close proximity to the distal edge 46 of the second back plate 39. Furthermore, in the preferred form of the invention the distal edges 45 and 46 of the first and second back plates 38 and 39 follow curvilinear paths. The first and second back plates 38 and 39 attach to the first building structural member 11 with fastener means 10. An n-shaped, substantially rigid washer member 12 sits proximate the concave seat member 2 and is formed with a receiving portion 13 having an opening 14 for receiving the anchor member 4 therethrough. The receiving portion 13 is dimensioned to closely fit between the first side member 5 and the second side member 6 to provide lateral bracing when the connector 1 is under tension loads. The receiving portion 13 is formed with a back edge 15. A back flange 19 integrally connects to the back edge 15 and extends towards the concave seat member 2. The back flange 19 has a back flange base 20 that is formed to be in registration with the concave seat member 2. The receiving portion 13 is also formed with an outward edge 16. An outward flange 17 integrally connects to the outward edge 16 and extends towards the concave seat member 2. The outward flange 17 is formed with an outward flange base 18 that is formed to be in registration with the concave seat member 2.

Referring to FIG. 11, the anchor member 4 can consist of an anchor bolt 23 and a holding means 22 attached thereto. The anchor bolt 23 can be formed with a distal end 32 and a proximal end 33. When the second building structural member 21 is a concrete foundation, the distal end 32 is embedded in the second building structural member 21, as shown in FIG. 11. The proximal end 33 of the anchor bolt 23 can be formed with a threaded portion 30 to which the holding means 22, generally a threaded nut, can releasably attach, completing the anchor member 4.

Referring to FIG. 1, the first and second back plates 38 and 39 of the preferred embodiment are formed with a plurality of openings 8 and 9 to receive fastener means 10.

Referring to FIG. 11, when the first building structural member 11 is made of wood, these fastener means 10 are preferably wood screws with cutting points. They can also be nails, threaded bolts with nuts, lag screws, or steel screws to name a few variations. The use of self-drilling wood screws as a fastener means 10 eliminates the need for the added step of drilling a hole for a regular bolt that has no drilling point. Also, self-drilling wood screws need not pass all the way through the first building structural member 11, so access to the back side 24 of the first building structural member 11 is not necessary. Self-drilling wood screws create a stronger connection than nails, and self-drilling wood screws can be installed almost as quickly as nails if an electric-powered or pneumatic wrench is used.

Referring to FIG. 1, the openings 8 and 9 are preferably arranged so that more than one opening can occur in the wide portions 47 and 49 of the curvilinear back plates 38 and 39 of the preferred embodiment. Ideally, the fastener receiving openings 8 in the first back plate 38 are offset from the fastener receiving openings 9 in the second back plate 39.

Referring to FIG. 1, in the preferred embodiment the lowest openings in the first back plate 38 are spaced from the bottom of the concave seat member 2 by a selected distance. This distance is dependent on the fastener means 10 to be used with the connector 1 and the form and composition of the first building structural member 11 to which the back plates 38 and 39 connect. Splitting of wooden structural members is a problem if fastener means 10 that pierce the first building structural member 11 are placed too close to the end 27 of the first building structural member.

When the first building structural member 11 is made of steel the connector can be welded to the first building structural member 11, in which case the back plates 38 and 39 need not be formed with openings 8 and 9.

Referring to FIG. 3, preferably, the opening 3 in the concave seat member 2 is obround in shape to accommodate misalignment of the anchor member 4 and the first building structural member 11.

The preferred embodiment is formed from light gauge galvanized steel. This permits the connector 1 to be made on standard, automated machinery common in the sheet metal connector industry. Furthermore, the preferred form requires no secondary production operations after it is formed such as welding or painting. This further reduces manufacturing costs. This also helps maintain uniformity between connectors.

FIGS. 11 and 12 show a typical use of the preferred embodiment. In FIGS. 11 and 12 the first building structural member 11 is a vertical stud of a framed wall and the second building structural member 21 is a concrete foundation. The present invention may also be used to transfer tension loads between floors of a framed structure, or to tie joists to masonry or concrete walls, to name but a few additional applications.

Installation of the connector 1 and n-shaped washer member 12 of one preferred embodiment to form a foundation-to-wooden stud connection is best illustrated by reference to FIG. 11. Installation of alternate forms is similar and is not repeated. It is to be noted that the connection also secures the transfer member 28, or mudsill as it is generally known, to the second building structural member 21.

First, an anchor bolt 23 is embedded in the second building structural member 21, which is commonly a poured concrete foundation. This can be done by placing the distal end 32 of the anchor bolt 23 in the wet concrete or by forming the second building structural element 21 with the proximal end 33 of the anchor bolt 23 protruding from it. An opening 29 is drilled in the transfer member 28 and the anchor bolt 23 is inserted therethrough with the threaded portion 30 of the proximal end 33 of the anchor bolt 23 exposed above the top of the transfer member 28.

The n-shaped washer member 12 is received by the concave seat member 2, with the outward and back flange bases 18 and 20 of the n-shaped washer member 12 sitting on the concave seat member 2 in close registration, the receiving portion 13 of the washer member 12 having been closely received between the first and second side members 5 and 6.

The threaded portion 30 of the anchor bolt 23 is inserted through the opening 3 in the concave seat member 2, and the opening 14 in the receiving portion of the n-shaped washer member 12. The back member 7 of the holdown connector 1 is set against the front side 31 of the first building structural member 11. Fastener means 10 are driven into the first building structural member 11 through the openings 8 and 9 in the back member 7, forming a tight fit between the back member 7 of the connector 1 and the first building structural member 11. A holding means 22 is then placed on the threaded portion 30 of the anchor bolt 23 and tightened down, completing the anchor member 4, and the connection. Optimally, the concave seat member 2 should rest on the transfer member 28, as shown in FIG. 11.

We claim:

1. A connector for tying a first building structural member to a second building structural member in conjunction with fastener means and an anchor member, said connector comprising:
  a. a pocket-like, concave seat member, formed with an opening substantially at said lowest point of said concave seat member which is also substantially said midpoint of said concave seat member, said opening formed for receiving said anchor member therethrough to attach said connector to said second building structural member, said pocket-like, concave seat member tapering towards said opening with tapering portions on either side of said opening, said tapering portions making up the greater part of said concave seat member;
  b. a first side member integrally connected to said concave seat member;
  c. a second side member integrally connected to said concave seat member;
  d. a back member connected to said first and second side members, said back member being formed to interface with said fastener means to attach said back member to said first building structural member; and wherein
  e. said back member is connected to said concave seat member, said connector is formed from metal, and said back member is welded to said first concave seat member and said first and second side members.

2. The connector of claim 1, comprising:
  a substantially rigid washer member located proximate said concave seat member and formed with a receiving portion having an opening for receiving said anchor member therethrough.

3. The connector of claim 2, wherein:
  said receiving portion of said washer member is dimensioned to closely fit between said first side member and said second side member to provide lateral bracing when said connector is under tension loads.

4. The connector of claim 3, wherein:
  said washer member has a base formed to be in registration with said concave seat member.

5. The connector of claim 4, wherein said washer member is n-shaped and comprises:
  a. said receiving portion formed with a back edge and an outward edge;
  b. a back flange integrally connected to said back edge and extending towards said concave seat member, said back flange formed with a back flange base that is formed to be in registration with said concave seat member; and
  c. an outward flange integrally connected to said outward edge of said receiving portion and extending towards said concave seat member, said outward flange formed with an outward flange base that is formed to be in registration with said concave seat member.

6. The connector of claim 5, wherein:
  fastener receiving openings are formed in said back member to receive fastener means for attaching said back member to said first building structural member.

7. A connector for tying a first building structural member to a second building structural member in conjunction with fastener means and an anchor member, said connector comprising:
  a. a pocket-like, concave seat member, formed with an opening substantially at said lowest point of said concave seat member which is also substantially said midpoint of said concave seat member, said opening formed for receiving said anchor member therethrough to attach said connector to said second building structural member, said pocket-like, concave seat member tapering towards said opening with tapering portions on either side of said opening, said tapering portions making up the greater part of said concave seat member;
  b. a first side member integrally connected to said concave seat member;

c. a second side member integrally connected to said concave seat member;

d. a black member connected to said first and second side members, said back member being formed to interface with said fastener means to attach said back member to said first building structural member; and wherein e. said back member comprises a first back plate integrally connected to said first side member, and a second back plate integrally connected to said second side member.

8. The connector of claim 7, wherein:

said first back plate overlaps a portion of said second back plate.

9. The connector of claim 8, comprising:

a substantially rigid washer member located proximate said concave seat member and formed with a receiving portion having an opening for receiving said anchor member therethrough.

10. The connector of claim 9, wherein:

said receiving portion of said washer member is dimensioned to closely fit between said first side member and said second side member to provide lateral bracing when said connector is under tension loads.

11. The connector of claim 10, wherein:

said washer member has a base formed to be in registration with said concave seat member.

12. The connector of claim 11, wherein said washer member is n-shaped and comprises:

a. said receiving portion formed with a back edge and an outward edge;

b. a back flange integrally connected to said back edge and extending towards said concave seat member, said back flange formed with a back flange base that is formed to be in registration with said concave seat member; and c. an outward flange integrally connected to said outward edge of said receiving portion and extending towards said concave seat member, said outward flange formed with an outward flange base that is formed to be in registration with said concave seat member.

13. The connector of claim 12, wherein:

fastener receiving openings are formed in said first and second back plates to receive fastener means for attaching said first and second back plates to said first building structural member.

14. The connector of claim 7 wherein:

a. said first back plate is formed with a distal edge; and b. said second back plate is formed with a distal edge that lies in close proximity to said distal edge of said first back plate.

15. The connector of claim 14, comprising:

a substantially rigid washer member located proximate said concave seat member and formed with a receiving portion having an opening for receiving said anchor member therethrough.

16. The connector of claim 15, wherein:

said receiving portion of said washer member is dimensioned to closely fit between said first side member and said second side member to provide lateral bracing when said connector is under tension loads.

17. The connector of claim 16, wherein:

said washer member has a base formed to be in registration with said concave seat member.

18. The connector of claim 17, wherein said washer member is n-shaped and comprises:

a. said receiving portion formed with a back edge and an outward edge;

b. a back flange integrally connected to said back edge and extending towards said concave seat member, said back flange formed with a back flange base that is formed to be in registration with said concave seat member; and c. an outward flange integrally connected to said outward edge of said receiving portion and extending towards said concave seat member, said outward flange formed with an outward flange base that is formed to be in registration with said concave seat member.

19. The connector of claim 18, wherein:

fastener receiving openings are formed in said first and second back plates to receive fastener means for attaching said first and second back plates to said first building structural member.

20. The connector of claim 7 wherein:

a. said first back plate is formed with a distal edge; and b. said second back plate is formed with a distal edge that lies in antipodal relation to said distal edge of said first back plate.

21. The connector of claim 20, comprising:

a substantially rigid washer member located proximate said concave seat member and formed with a receiving portion having an opening for receiving said anchor member therethrough.

22. The connector of claim 21, wherein:

said receiving portion of said washer member is dimensioned to closely fit between said first side member and said second side member to provide lateral bracing when said connector is under tension loads.

23. The connector of claim 22, wherein:

said washer member has a base formed to be in registration with said concave seat member.

24. The connector of claim 23, wherein said washer member is n-shaped and comprises:

a. said receiving portion formed with a back edge and an outward edge;

b. a back flange integrally connected to said back edge and extending towards said concave seat member, said back flange formed with a back flange base that is formed to be in registration with said concave seat member; and c. an outward flange integrally connected to said outward edge of said receiving portion and extending towards said concave seat member, said outward flange formed with an outward flange base that is formed to be in registration with said concave seat member.

25. The connector of claim 24, wherein:

fastener receiving openings are formed in said first and second back plates to receive fastener means for attaching said first and second back plates to said first building structural member.

26. The connector of claim 14, wherein:

a. said first back plate is formed with alternating wide and narrow portions; and b. said second back plate is similarly formed with alternating wide and narrow portions that are offset from said first back plate such that said distal edge of said first back plate lies in close proximity to said distal edge of said second back plate.

27. The connector of claim 26, wherein:

said distal edges of said first and second back plates follow curvilinear paths.

28. The connector of claim 26, wherein:
a. said first and second back plates are formed with fastener receiving openings; and
b. said first and second back plates having a plurality of spaced apart fastener receiving openings in said wide portions.

29. The connector of claim 28, wherein:
said fastener receiving openings in said first back plate are offset from said fastener receiving openings in said second back plate.

30. The connector of claim 29, comprising:
a substantially rigid washer member located proximate said concave seat member and formed with a receiving portion having an opening for receiving said anchor member therethrough.

31. The connector of claim 30, wherein:
said receiving portion of said washer member is dimensioned to closely fit between said first side member and said second side member to provide lateral bracing when said connector is under tension loads.

32. The connector of claim 31, wherein:
said washer member has a base formed to be in registration with said concave seat member.

33. The connector of claim 32, wherein said washer member is n-shaped and comprises:
a. said receiving portion formed with a back edge and an outward edge;
b. a back flange integrally connected to said back edge and extending towards said concave seat member, said back flange formed with a back flange base that is formed to be in registration with said concave seat member; and
c. an outward flange integrally connected to said outward edge of said receiving portion and extending towards said concave seat member, said outward flange formed with an outward flange base that is formed to be in registration with said concave seat member.

34. A connector for tying a first building structural member to a second building structural member in conjunction with fastener means and an anchor member, said connector comprising:
a. a pocket-like, concave seat member, formed with an opening substantially at said lowest point of said concave seat member which is also substantially said midpoint of said concave seat member, said opening formed for receiving said anchor member therethrough to attach said connector to said second building structural member, said pocket-like, concave seat member tapering towards said opening with tapering portions on either side of said opening, said tapering portions making up the greater part of said concave seat member;
b. a first side member integrally connected to said concave seat member;
c. a second side member integrally connected to said concave seat member;
d. a black member connected to said first and second side members, said back member being formed to interface with said fastener means to attach said back member to said first building structural member; and wherein
e. said concave seat member comprises a first concave seat plate integrally attached to said first side member, and a second overlapping concave seat plate integrally attached to said second side member.

35. The connector of claim 34, comprising:
a substantially rigid washer member located proximate said concave seat member and formed with a receiving portion having an opening for receiving said anchor member therethrough.

36. The connector of claim 35, wherein:
said receiving portion of said washer member is dimensioned to closely fit between said first side member and said second side member to provide lateral bracing when said connector is under tension loads.

37. The connector of claim 36, wherein:
said washer member has a base formed to be in registration with said concave seat member.

38. The connector of claim 37, wherein said washer member is n-shaped and comprises:
a. said receiving portion formed with a back edge and an outward edge;
b. a back flange integrally connected to said back edge and extending towards said concave seat member, said back flange formed with a back flange base that is formed to be in registration with said concave seat member; and
c. an outward flange integrally connected to said outward edge of said receiving portion and extending towards said concave seat member, said outward flange formed with an outward flange base that is formed to be in registration with said concave seat member.

39. The connector of claim 38, wherein:
fastener receiving openings are formed in said back member to receive fastener means for attaching said back member to said first building structural member.

40. A connector for tying a first building structural member to a second building structural member in conjunction with fastener means and an anchor member, said connector comprising:
a. a pocket-like, concave seat member, formed with an opening substantially at said lowest point of said concave seat member which is also substantially said midpoint of said concave seat member, said opening formed for receiving said anchor member therethrough to attach said connector to said second building structural member, said pocket-like, concave seat member tapering towards said opening with tapering portions on either side of said opening, said tapering portions making up the greater part of said concave seat member;
b. a first side member integrally connected to said concave seat member;
c. a second side member integrally connected to said concave seat member;
d. a back member connected to said first and second side members, said back member being formed to interface with said fastener means to attach said back member to said first building structural member; and wherein
e. said concave seat member comprises a first concave seat plate integrally attached to said first side member, a second, overlapping concave seat plate integrally attached to said second side member, and a third, overlapping concave seat plate integrally attached to said back member.

41. The connector of claim 40, comprising:
a substantially rigid washer member located proximate said concave seat member and formed with a receiving portion having an opening for receiving said anchor member therethrough.

42. The connector of claim 41, wherein:

said receiving portion of said washer member is dimensioned to closely fit between said first side member and said second side member to provide lateral bracing when said connector is under tension loads.

43. The connector of claim 42, wherein:

said washer member has a base formed to be in registration with said concave seat member.

44. The connector of claim 43, wherein said washer member is n-shaped and comprises:

a. said receiving portion formed with a back edge and an outward edge;

b. a back flange integrally connected to said back edge and extending towards said concave seat member, said back flange formed with a back flange base that is formed to be in registration with said concave seat member; and c. an outward flange integrally connected to said outward edge of said receiving portion and extending towards said concave seat member, said outward flange formed with an outward flange base that is formed to be in registration with said concave seat member.

45. The connector of claim 44, wherein:

fastener receiving openings are formed in said back member to receive fastener means for attaching said back member to said first building structural member.

46. A connector for tying a first building structural member to a second building structural member in conjunction with fastener means and an anchor member, said connector comprising:

a. a seat member, formed with an opening for receiving said anchor member therethrough to attach said connector to said second building structural member;

b. a first side member integrally connected to said seat member;

c. a second side member integrally connected to said seat member; and d. a back member connected to said first and second side members, said back member being formed to interface with said fastener means to attach said back member to said first building structural member, said back member comprising a first back plate integrally connected to said first side member and a second back plate integrally connected to said second side member, said first back plate being formed with a distal edge and with alternating wide and narrow portions, and said second back plate being formed with a distal edge and with alternating wide and narrow portions that are offset from said alternating wide and narrow portions of said first back plate such that said distal edge of said first back plate lies in close proximity to said distal edge of said second back plate.

47. The connector of claim 46, wherein:

said distal edges of said first and second back plates follow curvilinear paths.

48. The connector of claim 46 wherein:

a. said first and second back plates are formed with fastener receiving openings; and b. said first and second back plates having a plurality of spaced apart fastener receiving openings in said wide portions.

49. The connector of claim 48, wherein:

said fastener receiving openings in said first back member are offset from said fastener receiving openings in said second back member.

50. The connector of claim 49, comprising:

a substantially rigid washer member located proximate said seat member and formed with a receiving portion having an opening for receiving said anchor member therethrough.

51. The connector of claim 50, wherein:

said receiving portion of said washer member is dimensioned to closely fit between said first side member and said second side member to provide lateral bracing when said connector is under tension loads.

52. The connector of claim 51, wherein:

said washer member has a base formed to be in registration with said seat member.

53. The connector of claim 52, wherein said washer member is n-shaped and comprises:

a. said receiving portion formed with a back edge and an outward edge;

b. a back flange integrally connected to said back edge and extending towards said seat member, said back flange formed with a back flange base that is formed to be in registration with said seat member; and c. an outward flange integrally connected to said outward edge of said receiving portion and extending towards said seat member, said outward flange formed with an outward flange base that is formed to be in registration with said seat member.

* * * * *